United States Patent
Almosilhi

(10) Patent No.: US 11,170,452 B1
(45) Date of Patent: *Nov. 9, 2021

(54) METHOD AND SYSTEM OF UTILIZING AN E-COMMERCE/CUSTOMER SOCIAL MEDIA AND NETWORKING PLATFORM

(71) Applicant: Mohammed Almosilhi, Dallas, TX (US)

(72) Inventor: Mohammed Almosilhi, Dallas, TX (US)

( * ) Notice: Subject to any disclaimer, the term of this patent is extended or adjusted under 35 U.S.C. 154(b) by 132 days.

This patent is subject to a terminal disclaimer.

(21) Appl. No.: 16/830,919

(22) Filed: Mar. 26, 2020

Related U.S. Application Data

(63) Continuation-in-part of application No. 15/648,412, filed on Jul. 12, 2017, now Pat. No. 10,614,443.

(60) Provisional application No. 62/467,239, filed on Mar. 5, 2017.

(51) Int. Cl.
 *G06Q 30/06* (2012.01)
 *G06Q 30/02* (2012.01)
 *G06Q 50/00* (2012.01)
 *H04L 12/58* (2006.01)

(52) U.S. Cl.
 CPC ......... *G06Q 50/01* (2013.01); *G06Q 30/0208* (2013.01); *G06Q 30/0245* (2013.01); *G06Q 30/0277* (2013.01); *G06Q 30/0282* (2013.01); *G06Q 30/0631* (2013.01); *H04L 51/046* (2013.01); *H04L 51/32* (2013.01)

(58) Field of Classification Search
 CPC ............... G06Q 50/01; G06Q 30/0208; G06Q 30/0245; G06Q 30/0631; G06Q 30/0277; G06Q 30/0282
 USPC ...................................................... 705/26.1
 See application file for complete search history.

(56) References Cited

U.S. PATENT DOCUMENTS

| | | | |
|---|---|---|---|
| 2010/0223119 A1* | 9/2010 | Klish | G06Q 10/00 705/14.26 |
| 2014/0040161 A1 | 2/2014 | Berlin | |

OTHER PUBLICATIONS

Malone, Timothy M. Relational Marketing: Value Integrated Systems and Applications. A Metatriangulation Analysis of how Customer Value is Created in Transaction Exchange in Electronic Commerce and its Implications to Marketing, The Union Institute, Ann Arbor, 2000, pp. 79-100. (Year: 2000).*

* cited by examiner

*Primary Examiner* — Alexis M Casey
(74) *Attorney, Agent, or Firm* — Michael Diaz

(57) ABSTRACT

A system of promoting a specific product or service by a person. The system includes a network and an e-commerce/customer social media and networking platform coupled to the network. The e-commerce/customer social media and networking platform includes a social networking platform providing social networking services to a plurality of users communicating with the e-commerce/customer social media and networking platform via the network and an e-commerce module for performing online purchase transactions of goods and services published on the e-commerce/customer social media and networking platform. The e-commerce module displays products or services for sale to the plurality of users and enacts purchase transactions of a product or service selected by a purchasing user. Endorsements received from the purchasing user may be published to a plurality of users following the purchasing user. In addition, the purchasing user may receive compensation based on sales of the endorsed product or service by other users following the purchasing user.

11 Claims, 7 Drawing Sheets

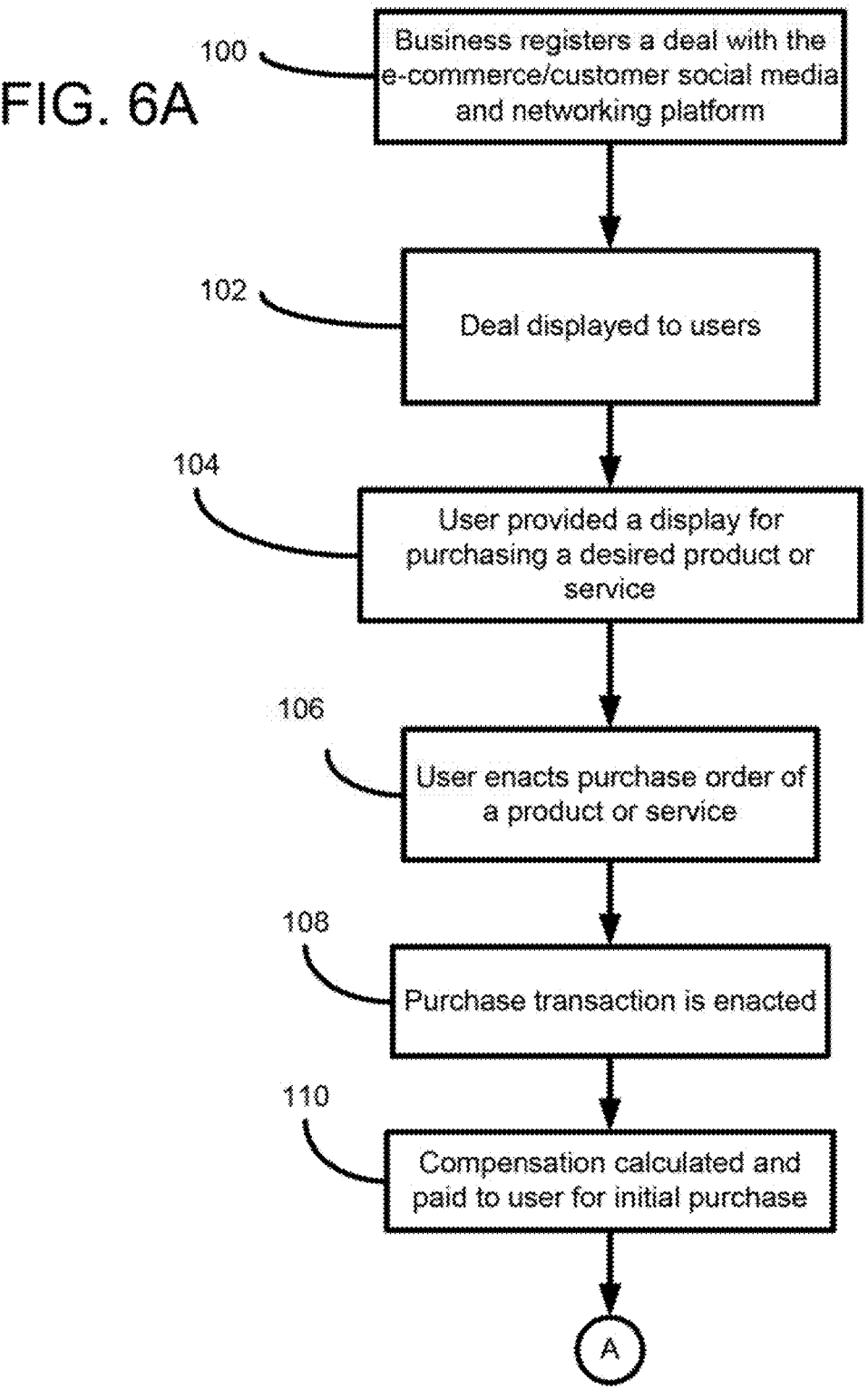

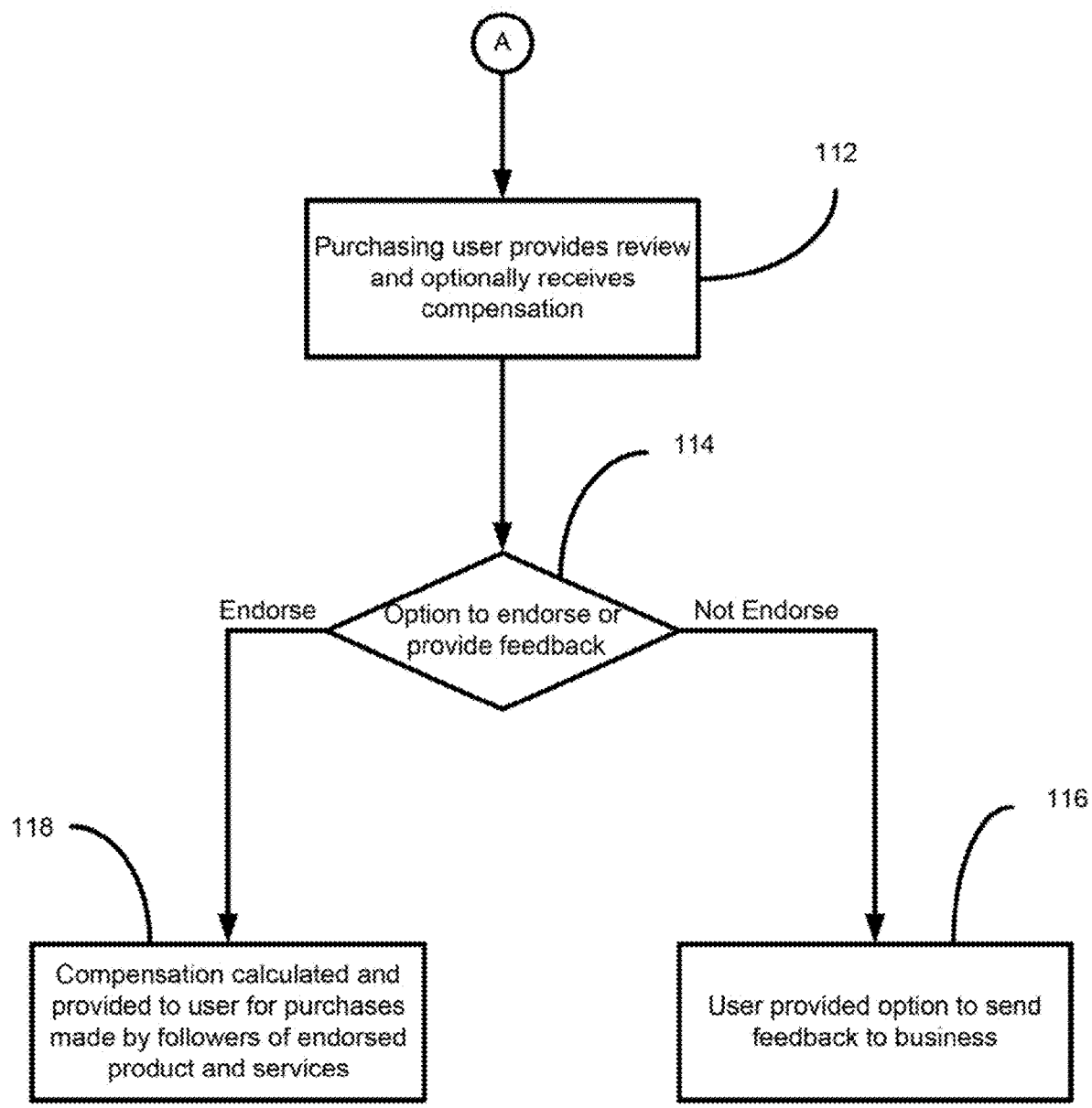

METHOD AND SYSTEM OF UTILIZING AN E-COMMERCE/CUSTOMER SOCIAL MEDIA AND NETWORKING PLATFORM

RELATED APPLICATIONS

This utility application is a continuation-in-part application of co-pending U.S. patent application Ser. No. 15/648,412 entitled "Method And System of Endorsing a Specific Product or Service By a Person Utilizing an E-Commerce/Customer Social Media and Networking Platform" filed on Jul. 12, 2017 under the name of Mohammed Almosilhi which claims the benefit of U.S. Provisional Patent Application Ser. No. 62/467,239 filed Mar. 5, 2017 by Mohammed Almosilhi, which is hereby incorporated by reference.

BACKGROUND OF THE INVENTION

Field of the Invention

This invention relates to communication systems. Specifically, and not by way of limitation, the present invention relates to a system and method of endorsing and promoting a specific or product to others by a person utilizing a combined e-commerce/customer social media and networking platform.

Description of the Related Art

Social networking platforms have exploded in popularity over the past few years. These social networking platforms enable users to establish electronic connections with others using the same social networking platforms. When uses are connected or associated with each other, they form a relationship as a "friend", "associate", etc. within the social networking platform. By being connected, a user is able to access more information of the connected user. Furthermore, these connected users are often provided other communication conduits to communicate with each other, such as instant messaging, email, phone, etc. Oftentimes, users "follow" other users and because of an established relationship with the other user, the users are influenced by the user being followed because of an established trust in the relationship for whatever reason, such as familiarity of the other user or expertise of the user. Because of these users or followers trust in the user being followed, users are influenced by the opinions, reviews, and recommendations of the user being followed.

In addition to the popularity and widespread use of social networking platforms, an equally impressive rise in use and popularity is e-commerce websites where merchants sell goods and services online. These e-commerce websites provide several advantages to users, such as convenience in buying the goods, in-depth analysis of the product and reviews by other uses of the products and services. Regarding the reviews by other purchases of the products and services on a particular e-commerce website, the reviews can be very helpful for other users in the decision in buying a specific product or service. However, the reviews are not completely trustworthy. It is not uncommon to see fake reviews provided by the merchants to provide a fraudulent approval by users. Additionally, some users have a wide disparity when it comes to likes and dislikes of a product. For example, it is not uncommon for a finicky user to provide disadvantages of the product, which, to most people, would be too minor to even by noticed while other reviewers may be far too generous in their review of a product. Because of the lack of familiarity of the reviewer, reviews can be view with a lot of doubt.

Businesses or merchants also often employ well-known or famous people to promote their products and services as a marketing tool to influence others. These businesses also spend a significant amount of money in sponsoring these famous people. However, there is no guarantee on their return on investment regarding the large amount of money to pay these famous people without relating to the success of the marketing campaign. Additionally, although famous people can influence a large segment of the population, there are also several people who are reluctant to trust all famous people.

Currently, there is no system or method which leverages the intimacy and established relationships within the social networking platforms among connected users with the advantages of an e-commerce platform which would enable the use of endorsements with various forms of compensation to both the endorser and the buyer. It is an object of the present invention to provide such a system and method.

SUMMARY OF THE INVENTION

In one aspect, the present invention is directed to a system of promoting a specific product or service by a person. The system includes a network and an e-commerce/customer social media and networking platform coupled to the network. The e-commerce/customer social media and networking platform includes a social networking platform providing social networking services to a plurality of users communicating with the e-commerce/customer social media and networking platform via the network and an e-commerce module for performing online purchase transactions of goods and services published on the e-commerce/customer social media and networking platform. The e-commerce module displays products or services for sale to the plurality of users and enacts purchase transactions of a product or service selected by a purchasing user. The system also receives and stores an endorsement of a service or product purchased by the purchasing user. The social networking module receives the stored endorsement and publishes the endorsement of the purchasing user to a plurality of users following the purchasing user through the social networking module. In one embodiment, the purchasing user may receive compensation based on sales of the endorsed product or service by other users following the purchasing user.

BRIEF DESCRIPTION OF THE DRAWINGS

FIGS. 6A and 6B are flow charts illustrating the steps of endorsing a product or service via the e-commerce/customer social media and networking platform according to the teachings of the present invention.

DESCRIPTION OF THE INVENTION

Figure 1:
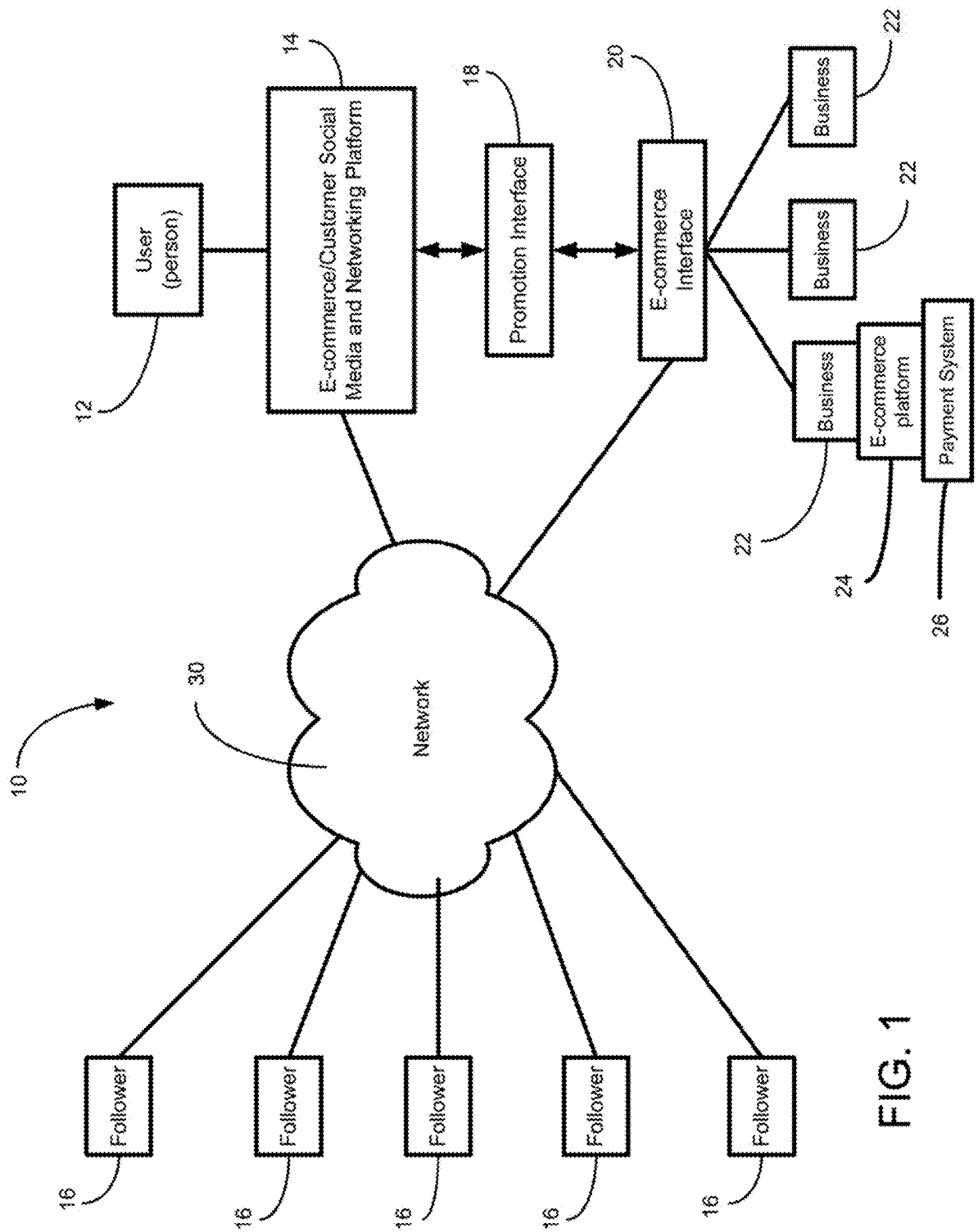
FIG. 1 is a block diagram of the components of a system in one embodiment of the present invention.

The present invention is a system and method of promoting or endorsing a product or service to followers of a person through a unique combined e-commerce/customer social media and networking platform. FIG. 1 is a block diagram of the components of a system 10 in one embodiment of the present invention. The system includes a person (or user of the system 10) 12. In a typical social networking setup, a person has a plurality of followers, who are also users of the system 10, connected via a social networking application. It is quite common for people to follow and get influenced by a wide variety of acquaintances, friends, family members, professions, or well-known figures. There are a wide variety of reasons for a person to be influenced by these connected people, such as familiarity of the person or trust in the accomplishments of the person. The present invention leverages this influence in the promotion and endorsement of goods and services. In the present invention, a follower may read reviews and comments to assist in their online purchase decision. In the present invention, people can review opinions by their trusted friends and contacts. The person 12, who is any person utilizing the system 10 communicates through a combination e-commerce/customer social media and networking platform 14 to a plurality of followers 16. It should be understood, the person may be a famous person or any person providing an endorsement of a product or service in the system 10. The present invention includes a promotion interface 18 which interfaces with the person 12's platform 14 and an e-commerce interface 20. In one embodiment, the e-commerce interface 20 emulates an e-commerce type store and enables businesses 22 to use the person's online following to promote, market, and sell to the person 12's followers. The business 22 may be a person or company entity which desires to sell goods or services to others. In another embodiment, e-commerce functionalities are performed at a third-party e-commerce platform 24 residing with the business 22's internet platform.

Businesses use people, oftentimes famous people, to promote their products and services as a marketing tool to influence their followers. These businesses also can spend a lot of money sponsoring these people. However, the compensation provided to these people does not always equate to a very good return on their investment relative to the compensation received by these famous people. Businesses are always concerned on how to attract and drive more customers to their businesses with the least amount of cost. The present invention utilizes people using a social networking site to capitalize on their relationships with each other to endorse or influence others in the purchases of goods and services.

The promotion interface 18 may be coupled, in communication, or incorporated with the e-commerce/customer social media and networking platform 14, with one or more servers operating the social networking website, or any other devices or application capable of providing networking services via a network 30. The followers 16 can access the e-commerce/customer social media and networking platform 14 and, if desired by the follower 16, the incorporated e-commerce interface 20 through a connection provided at the e-commerce/customer social media and networking platform 14. The e-commerce/customer social media and networking platform may be operated for display on any website or other application which enables a social network with others in combination with the e-commerce functionality on behalf of one or more businesses. The users may use any communication device, such as a computing device, cellular telephone, or a personal digital assistance to access the e-commerce/customer social media and networking platform 14 or e-commerce interface 20. It should be understood that the number of followers, persons, and businesses may vary and are not limited to the number shown in FIG. 1. The system 10 may utilize a website, an "app" or any interface for a person or follower to communicate through the network 30. The network 30 may be the Internet, a local area network, or any other network that allows communication between the various components of the system 10. The network 30 may also utilize standard communications technologies and/or protocols.

Figure 2:
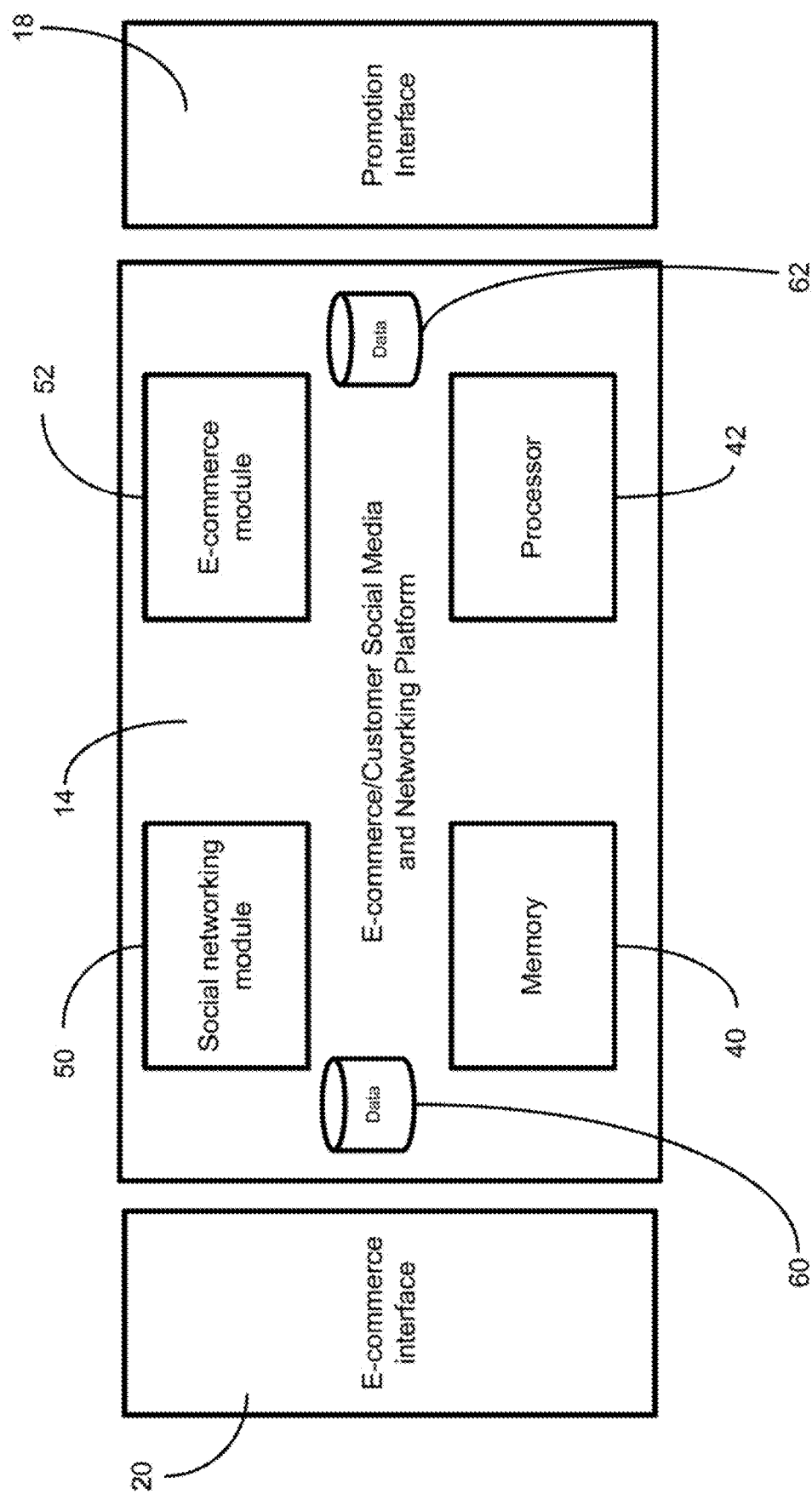
FIG. 2 is a simplified diagram of the e-commerce/customer social media and networking platform in one embodiment of the present invention.

The e-commerce/customer social media and networking platform 14 provides a dual function in one platform. First, it provides a social media and networking platform connecting a plurality of people together, in this case, between the person 12 and the plurality of followers 16. Second, the e-commerce/customer social media and networking platform 14 provides a conduit for purchasing online products and services. In one embodiment, the e-commerce/customer social media and networking platform 14 employs and combines both functions in one platform. In another embodiment, the function of e-commerce functionality may be located anywhere in the system 10, with the business 22 or any other location external or internal to the e-commerce/customer social media and networking platform 14. The e-commerce/customer social media and networking platform 14 may be any server, computer or device configured to process the functions discussed above. FIG. 2 is a simplified diagram of the e-commerce/customer social media and networking platform 14 in one embodiment of the present invention. In one embodiment, the e-commerce/customer social media and networking platform 14 may also include a memory 40 for storing a set of instructions and a processor 42 for executing the instructions. The processer may access information from, and store information in a nonremovable memory, a removable memory, or a combination thereof, also collectively referred to herein as computer readable media. Illustrative nonremovable memory may consist of RAM, ROM, a hard disk, or other well-known memory storage technologies. Illustrative removable memory may consist of one or more Subscriber Identity Module (SIM) cards, or other well-known memory storage technologies, such as "smart cards," magnetic disks, floppy disks, optical disks, magneto-optical disks, magnetic tapes, or any suitable non-volatile memory. As will be discussed below, the set of instructions executed by the e-commerce/customer social media and networking platform 14 permit the server to process the social networking functions with the e-commerce functions while allowing a user to endorse or promote a product or service. In the e-commerce/customer social media and networking platform, the processor and memory are utilized to provide the combined e-commerce/customer social media and networking functionality through a social networking module 50 providing social networking services including posting of comments and endorsements and an e-commerce module 52 providing e-commerce online purchases, delivery, etc. services for the business to the buyer (user and followers). In another embodiment, the e-commerce functionality of the e-commerce module 52 may be internal or external of the e-commerce/customer social media and networking platform. For example, the functions of the e-commerce module may be anywhere in the system 10, business 22 or external to the e-commerce/customer social media and networking platform.

In one embodiment, the present invention may be utilized by a person (endorsing user) 12 to endorse or promote a product or service to which the person has purchased through the e-commerce/customer social media and networking platform 14. The followers 16 may be presented in the e-commerce/customer social media and networking platform through the e-commerce interface 20 with information on the products or services being promoted by the person 12 or other persons. The promotion interface may be provided as a conduit for the followers to enter the e-commerce interface 20 from the e-commerce/customer social media and networking platform 14. In one embodiment, the e-commerce interface 20 may optionally be an online store where businesses 22 and other related companies may use the person's account to promote, mark and sell to the followers. Each person 12 may have postings on either the e-commerce/customer social media and networking platform or to a particular page in the e-commerce interface 20 disseminating information on products or services for which the person recommends.

The e-commerce/customer social media and networking platform 14 allows its shoppers (users) to endorse and promote their favorite, liked, trusted and recommended purchased deals to their followers, thereby influencing and encouraging each other to purchase the same deals. Additionally, followers can interact with those users they follow and provide comment, as well as ask and answer questions regarding the promotions/endorsements by the other users. Thus, the present invention allows two-way communications between the user and the followers of the user. It should be understood that the e-commerce/customer social media and networking platform 14 provides a social media functionality through the use of web-based and mobile technologies to enable interactive dialogue between the users. By using the platform 14, social networking is provided to the followers to interact in a social structure with people having a common interest in this case, the purchase of specific products and services by a plurality of customers. Furthermore, to incentivize the process, endorsing users may be compensated with a percentage or flat fee commission on each sold deal or enacted by the followers and directed attributable to the endorsing person. The present invention enables the users to follow other users such as friends, family members, neighbors, people from the community, professionals, experts, well known individuals. This functionality enables the users and followers to view their liked, trusted and recommended purchased deals which they endorse and promote in the system 10. A follower (a potential buyer) can view and read the opinions of endorsed deals on products and services listed on the e-commerce/customer social media and networking platform 14. Finally, the e-commerce/customer social media and networking platform provides the e-commerce functionality, thereby allowing users to purchase goods and service and optionally receive a commission or discount in the purchase of the goods or services and endorsement of the items. In one embodiment, the endorsing user only receives compensation for those purchases in which it can be verified that a follower viewed the endorsement of the endorsing user. Additionally, in one embodiment, the compensation may be awarded only when a follower purchases an endorsed product within a specified period of time after viewing the endorsement. For example, the endorsing user may receive compensation only when a follower purchases the endorsed product within 20 days (or whatever predetermined and specified amount of time) of viewing the endorsement. After the specified time period, if a follower purchases the product, the endorsing user does not receive compensation. The endorsements may be recorded and stored anywhere within the system 10 or anywhere external to the e-commerce/customer social media and networking platform.

The e-commerce/customer social media and networking platform 14 may be implemented in various ways to communicate to the users of the system 10. In one embodiment of the present invention, the e-commerce/customer social media and networking platform 14 may include a plurality of web pages hosted by a server dedicated to the services of the e-commerce/customer social media and networking platform. These pages may include information and functionality for social networking services and e-commerce services. Regarding the functionality of the social networking services, the web pages may include information on users and group profiles and other social networking pages, such as personal information on the user and the user's followers/friends. Data related to the social networking information of the user may be stored in a social networking database 60 dedicated to the e-commerce/customer social media and networking platform 14. Likewise, information related to a business 22 and their products and services, including any deals may be stored in an e-commerce database 62 specifically dedicated to the e-commerce/customer social media and networking platform 14. These databases may be separate or combined into a single database.

Figure 3:
FIG. 3 is a screen shot of a deal webpage in one embodiment of the present invention.
Figure 4:
FIG. 4 illustrates a screenshot of a wall webpage of one user of the system.
Figure 5:
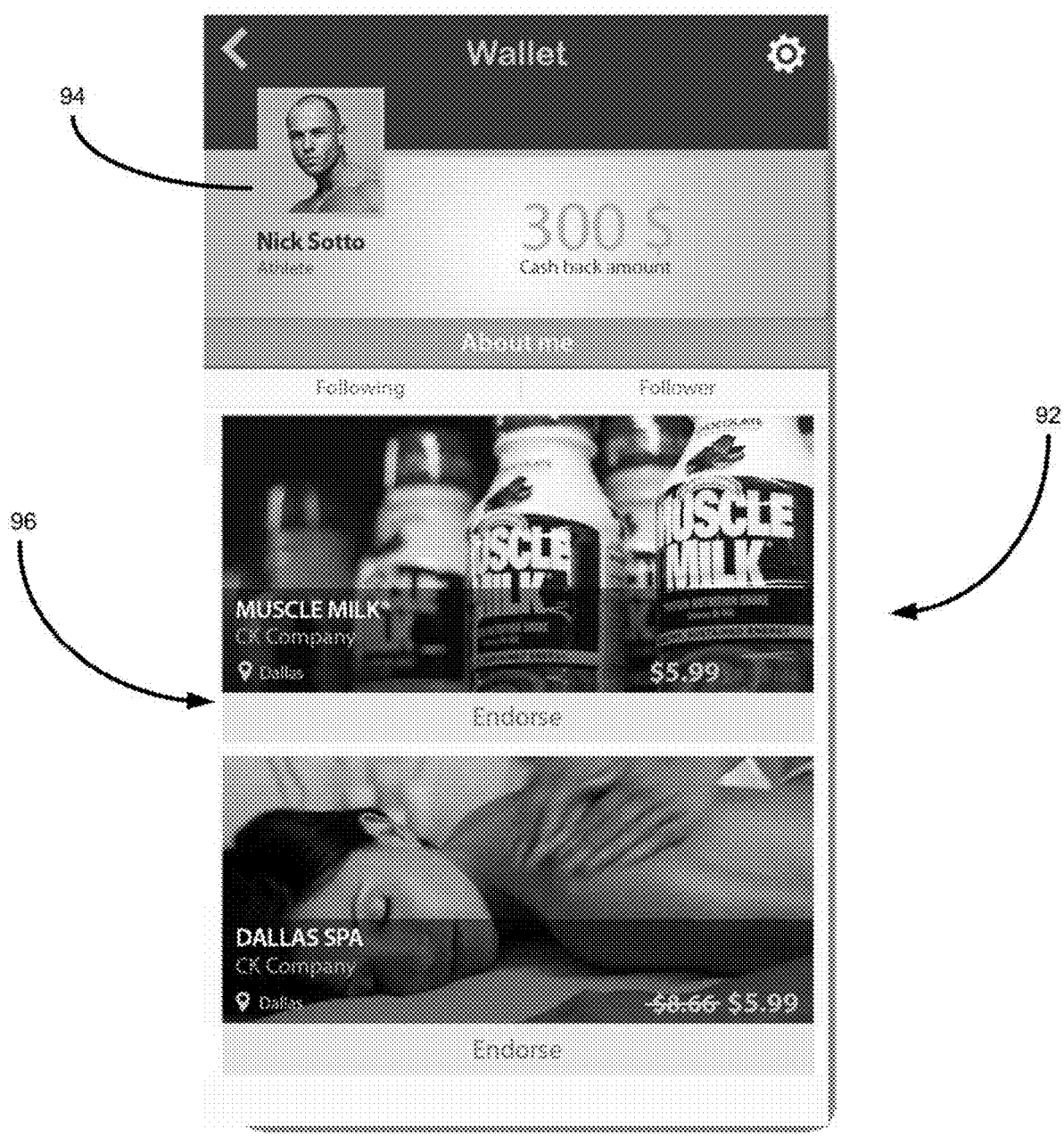
FIG. 5 is a personal profile webpage where a user's individual earnings may be displayed.

In one embodiment, the e-commerce/customer social media and networking platform 14 may utilize three types of webpages to convey information to a user: a deal webpage, a wall webpage and a personal profile webpage. In one type of webpage entitled "deal webpage," this webpage provides information on all types of deals (e.g., discounted products or services for sale by the businesses 22). These deals may be filtered for a specific user, such as to a geographical area (e.g., city) or to a certain demographic type (e.g., age and gender of user). FIG. 3 is a screen shot of a deal webpage 70 in one embodiment of the present invention. The deal webpage 70 may include a search function 72, a display area 74 displaying the current deals, and one or more filters 76 (such as a location tab and a category tab). In this embodiment, the deals webpage 70 provides products and services which have not yet been endorsed by any user to which the currently viewing user is following. In this embodiment, once a deal has been endorsed by a user to which the viewer is following, the deal for that product or service disappears from the deal webpage 70 and is posted under a general wall webpage (see FIG. 4) of the user endorsing the product. Thus, if the viewing user wishes to purchase the product or service, the user would go to the general wall webpage (FIG. 4) or a personal profile webpage (FIG. 5). However, deals will be shown on the deals webpage if the deal is not endorsed by a user the viewer is following. For example, another user may endorse a product, but if that person is not followed by the viewing user, the deal will still be displayed on the deal webpage 70. FIG. 4 illustrates a screenshot of a wall webpage 80 of one user of the system 10. On this viewing user's wall webpage 90, the viewing user may view those products and services endorsed by various other users to which the viewing user follows. As shown in FIG. 4, a plurality of other users' endorsements 82 is displayed in chronological order. For each endorsement 82, the user's name and a short comment may be listed for that endorsement. The wall page will continue to list all of the user's endorsements followed by the viewing user. Thus, each endorsed deal is posted on this wall webpage 80. In one embodiment, one must follow the user in order to see the wall webpage 80 of the user and see the endorsed deals. In one exception of this embodiment, there may be a section for professionals or people from the same community for which another user may view even if the user does not follow the endorsing user. The specific deals endorsed by a user followed by the viewing user may be listed in the display section 84. The wall webpage may also include a search section 86 for directing the user to other users. In addition, professionals and community listed endorsements may be selected on the wall webpage, thereby showing the endorsements. However, since these professionals or other users in the community are not followed by the viewing user, the deal page will still show the deals. When the viewing user begins to follow someone in their community, then the product or service is removed from the deal page. Regarding filtering people through community or profession, the platform 14 may filter all users in the filtered group (e.g., community) and list these users and their endorsements even though the viewing user does not follow the endorsing user. In one embodiment, a search for a particular use may be conducted and the viewing user may select that person to find a profile page to see previous endorsements by that person, even though they have not followed them. However, until the viewing user follows the person endorsing a product or service, the viewing user cannot purchase directly through the endorsing user's personal profile webpage. As discussed above, the user may also access another's wall webpage using a professional's tab 88 and a community tab 90. The professional tab 88 enables a user to review wall webpages of various professionals (e.g., experts in a certain field). The community tab 90 enables a user to view the wall webpages of others in a certain community. In either case when selecting either the community tab 90 or the professional tab 88, a viewing user may access and purchase a product endorsed by another in these two sections without actually following the endorsing user. FIG. 5 is a personal profile webpage 92 where a personal profile of the individual may be displayed. The person profile webpage 92 provides a public view and a private view only viewable by that particular individual. In the private view only shown to the actual person of the personal profile, compensation received by that individual is displayed. For example, in one embodiment, endorsing users 12 are compensated by commission for the endorsement and sales of certain products and services, such as earned cash back and a commission amount of items purchased by followers of the endorsing person. The personal profile webpage may include a user identification section 94 for displaying the user's profile. This section may also display the total amount compensated to the user (only viewable by that individual). This information on compensation for a particular user is only displayed to the user alone; no other person can see the compensation portion of the personal profile webpage. However, the personal profile webpage also provides a public view which performs the function of providing a personal profile of the user to others (without displaying the compensation received by the user). A viewing user may select a user endorsing a product on the wall webpage (FIG. 4) which directs the viewing user to the public view of the personal profile webpage 92 of the user endorsing a product. The personal profile webpage 92 may also include a display area 96 for displaying the products and services bought by the user. This page also enables the user to view all purchased deals and provides an option to endorse products or services the user liked. For each deal endorsed by a user, the endorsing user may provide text, photos or video providing an endorsement for the product or service. Additionally, the personal profile webpage may allow that particular user to send feedback to the business selling a product or service. Any feedback by the user to the business is not displayed to others, the feedback is sent directly to the business. The business may respond to the feedback by sending further offers such as discounts, free items, percentage compensation (e.g., 5% cashback), etc. for providing the feedback. In FIG. 5, only endorse button are shown, but in another embodiment, a feedback button may be used to enable users to provide direct feedback to the business. In one embodiment of the present invention, the user is provided with two options after purchasing a product or service, namely either endorsing the product or providing private feedback to the business.

In the present invention, businesses 22 may provide incentives to purchase goods and services while also compensating users that endorse and publish their endorsements to others. The business creates deals and publishes deals through the e-commerce interface 20. The deals may be implemented in a wide variety of ways. First, the business may sell the product or service as a "special offer", specifically a discount from the original price. Next, the business may simply offer the product or service at the original or actual price with no discount. In another form, the business may offer "free samples" where a specific and defined number of free samples or vouches are given away. Additionally, the business may offer "special occasions" deals where customized deals are presented to people on the user's special occasion, such as a birthday or anniversary. For example, a 50% discount may be provided to users who have their birthday during a certain period of time. In still another form, the business may provide a "happy hour" deal where one may purchase one product or service and receive a second one free. Business may also offer a "prerelease" deal where the business sells their products and services prior to an actual launch at a lower or higher price. In any case, the system may implement any discount and compensation scheme to the endorsing user and the user's followers and still remain in the scope of the present invention.

To provide an incentive for person (endorsing user) 12 to promote or endorse the products or services to which they purchased, businesses may provide compensation in using the system 10. First, the user may receive a cashback, a discount or a commission of a defined amount or percentage of the price as defined by the business. For example, a person may receive a ten percent cashback, which is accumulated by the user and displayed on the personal profile webpage of the user. This may be a discount on the sale of the product or service, an actual payment of the cashback, or the ability to use the cashback for other purchases, as defined by the business when offering the deal on the deal webpage. Additionally, in one embodiment of the present invention, when the user endorses a product, the user may receive a commission on any purchase of the same product by the user's followers or people buying the product or service on the wall webpage (e.g., for professionals or in a community). In addition, the user may optionally receive a further cashback for submitting a feedback even if negative in nature to the business on the purchased product. Thus, the user receives an incentive in the form of compensation for the purchase and endorsement of a product or service attributed to a business through the system 10. To receive this compensation as well as to endorse the product, in one embodiment, a user must actually purchase the product or service. In one embodiment, the endorsing user only receives compensation for those purchases in which it can be verified that a follower viewed the endorsement of the endorsing user. Additionally, in another embodiment, the compensation may be awarded only when a follower purchases an endorsed product within a specified period of time after viewing the endorsement. For example, the endorsing user may receive compensation only when a follower purchases the endorsed product within 20 days (or whatever predetermined and specified amount of time) of viewing the endorsement. After the specified time period, if a follower purchases the product, the endorsing user does not receive compensation. This provides integrity in the endorsement and compensation process. The endorsements may be recorded and stored anywhere within the system 10 or anywhere external to the e-commerce/customer social media and networking platform. In another embodiment of the present invention, a "toss" functionality may be used to incentivize sales of products and services through the platform 14. In one example, the toss option may be provided sometime during the buying process, such as on the checkout or buy webpage. Preferably, the toss option will be allowed only on a limited number of listed deals. Businesses selling products/services through the platform 14 may be provided the option to allow the toss option to buyers. This option enables a preselected number of the users to be randomly chosen for the chance to get the desired deal for free, large discount or other special incentive for purchasing the products/services. Businesses may be provided with the toss option when creating a deal whereby the business enters the number of the deals for which a special incentive is being offered. When a user clicks on the toss option, the purchasing users may be randomly selected through a random generator within the platform 14. For example, a business may agree to sell 1000 items via the platform 14 and commit to a preselected number of 50 free items. When the purchasing user purchases the product/service, the user is provided with the chance to receive one of these 50 free items.

With reference to FIGS. 1-5, the operation of the system 10 will now be explained. First, businesses 22 post deals on the deals web page 70. The business may provide deals as discussed above for discounts or reduced prices. Additionally, the business may provide specific compensation to those users endorsing a product or service through the system 10. The business enters the deals through the e-commerce interface and the promotion interface 18. The deals are stored in the system 10 and may include various forms of information on the product or service for sale. The information may include a feedback page, photographs and specifications of the products or services, and the price of the product. The present invention enables the business to submit the deals to the e-commerce/customer social media and networking platform 14 for viewing by the users and followers of the e-commerce/customer social media and networking platform 14. In addition, a user registers with the e-commerce/customer social media and networking platform. The typical social networking services are provided through the social networking module 50. The user may form relationships with friends, contacts, fellow workers, family, etc. These other people may be followers 16 connected with the person 12 by way of the social networking module 50. Next, a user (follower or person) may explore the deal webpage 70 and the various persons the user follows by viewing the viewer's wall webpage 80 illustrating the users' endorsements to which the viewing user follows. The user may encounter a product or service for which the user wishes to purchase. The user may receive cashback compensation (e.g., 10 percent) whether the products or services were purchased on the deal webpage 70 or the wall webpage 80. Next, the e-commerce/customer social media and networking platform 14 receives the purchase orders and sends the purchase request to the business using the e-commerce module 52 and through the e-commerce interface 20. The purchase and handling of the product is handled in the same fashion as any e-commerce online purchase (e.g., running a credit card purchase, receiving order information and delivery instructions, etc.). The e-commerce/customer social media and networking platform 14 also calculates the compensation due to the purchasing user. This information is calculated by the e-commerce module 52 and displayed via the social networking module 50 on the users personal profile webpage 92. As discussed above, in one embodiment, the e-commerce functionality of the e-commerce module 52 may be accomplished anywhere within or external to the system 10. Thus, all the purchased deals are listed on the user's personal profile webpage 92. The purchasing user is then given the option of either endorsing the product or service or providing feedback to the business. If the user does not recommend the deal, feedback may be sent to the business. In one embodiment, to encourage the user to provide useful feedback information as well as encourage the user to eventually endorse the product, a business may provide some form of compensation, discount, exchange, etc. to the user providing feedback. Additionally, if the user does endorse the product or service purchased, the e-commerce module may continue to tabulate and calculate further compensation due to the purchasing user when followers or other purchases attributed to the user's endorsement are purchased by these other users. The recordation and storage of the compensation tabulation may be accomplished anywhere within the system 10. The amount is then displayed in the personal profile webpage 92 for the specific user only. The compensation is then provided to the user at a defined time period.

FIGS. 6A and 68 are flow charts illustrating the steps of endorsing a product or service via the e-commerce/customer social media and networking platform 14 according to the teachings of the present invention. With reference to FIGS. 1-6, the method will now be explained. The method begins in step 100 where the business 22 posts a deal using the e-commerce module 52. The data on this deal is stored in the e-commerce database 62. The e-commerce/customer social media and networking platform 14 takes this data and displays the deal on the users' deals webpage 70. The present invention enables the business to submit the deals to the e-commerce/customer social media and networking platform 14 for viewing by the users and followers of the e-commerce/customer social media and networking platform 14. To utilize the system, a user registers with the e-commerce/customer social media and networking platform. The typical social networking services are provided through the social networking module 50. The user may form relationships with friends, contacts, fellow workers, family, etc. These other people may be followers 16 connected with the person 12 by way of the social networking module 50. In step 102, the e-commerce/customer social media and networking platform 14 provides a web application for a user (follower or person) to explore the deal webpage 70 and the various persons the user follows on the wall webpage 80. Upon encountering a deal which the user wishes to purchase, or a product or service endorses by another user, in step 104, the e-commerce module or system 10 provides a display to purchase the desired product or service. Next, in step 106, the user then encounters a product or service for which the user wishes to purchase and enacts a purchase order. In step 108, the e-commerce/customer social media and networking platform 14 receives the purchase orders and transacts the purchase using the e-commerce module 52 or other external e-commerce platform. In one embodiment of the present invention, the user may select a "buy in" link, enabling buying in a specific business. In one embodiment, the platform may utilize location services to determine the location of a user. The platform 14 may then provide a "buy in" link which provides deals specific to that location (e.g., in a store). In another embodiment, a user may view a specific group oriented to a specific interest, such as sports, school, etc. A user may join the group and be provided with information on endorsements from its members. The purchase transaction is then handled in a typical e-commerce process (e.g., running a credit card purchase, receiving order information and delivery instructions, etc.). In step 110, the e-commerce/customer social media and networking platform 14 also optionally calculates and pays an initial compensation due to the purchasing user for initially purchasing the product or service. This information is calculated by the e-commerce module 52 (or other external e-commerce platform) and displayed via the social networking module 50 on the user's personal profile webpage 92. Thus, all the purchased deals are listed on the user's personal profile webpage 92. Next, in step 112, the purchasing user may optionally review (either a positive endorsement or providing feedback to the merchant or business) the purchased product or service. If a review is submitted by the purchasing user, the purchasing user may optionally be awarded compensation. In step 114, it is determined by the platform 14 if the purchasing user has given an endorsement of the purchased product or service or submitted feedback to the merchant/business on the purchased product or service. If it is determined in step 114 that the person does not endorse the product or service, in step 116, the platform 14 may enable the user to send feedback to the business. This feedback may result in the user optionally receiving some form of compensation, discount, exchange or other incentive by the business for providing useful information (feedback) on the product or service as described in step 112. In step 114, if it is determined that the user endorses the product, in step 118, the e-commerce module continues to tabulate and calculate further compensation due to the purchasing user when followers or other purchases attributed to the user's endorsement are purchased by these other users. The amount is then displayed in the private view of the user's personal profile webpage 92. The compensation may then be provided to the user for a defined time period.

In one embodiment, it should be understood that the e-commerce/customer social media and networking platform 14 may utilize the third-party business 22's e-commerce platform 24 to transact any business or transaction (e.g., sale of product or services). In this embodiment, the user may purchase through the business' online platform 24 (see FIG. 1) to enact a purchase. A record of this purchase may then be relayed to the e-commerce/customer social media and networking platform 14 for use in the system 10 through the e-commerce interface 20. Likewise, the purchase may be accomplished by a third-party point of sale (POS) system which enables the purchasing user to purchase a product either online or in person through the business' POS system. In one embodiment, the system 10 may be integrated or internalized within any third-party platform. Additionally, the process of obtaining, recording and storing the endorsement may be accomplished by a third-party platform. In one embodiment, the present invention may use the POS system of the third-party or other payment system/method (shown as payment system 26 in FIG. 1) to purchase a product or service from the third-party platform. In this embodiment, when the user purchases the product or service, the POS system or the other payment system/method records and sends to the E-commerce/Customer Social Media and Networking Platform 14 itemized information of the purchases of the product/service. This itemized information may include a specific description of the purchased product/service, image of the product/service, price of each product/service, etc. In existing POS system, typically only the total cost of the products/services purchases is provided, but in the present invention, information on each purchased product/service is detailed. Thus, in one embodiment, the system 10 may integrate any third-party payment system/method or POS system with the E-commerce/Customer Social Media and Networking Platform 14.

The present invention utilizes and leverages a person's relationship with others in a social networking setting to endorse and promote a business' products or services. The person may provide personal reviews, recommendations as well as promotional videos showing customers that are using their products and services. In one embodiment of the present invention, each reviewer (user endorsing a product) may be evaluated by others to determine the value of the review. The present invention enables followers (customers) on social networking applications to follow a person they trust or are influenced by who may be experts in their industry and can view what products or services they use, like, trust, and recommend. If the customers are interested in a particular product or service, the customers may make direct purchases through the e-commerce/customer social media and networking platform 14. In another embodiment of the present invention, a user may join a group and see all the products or services endorsed by members of the specific group, even if the user does not follow a particular endorsing user.

The present invention provides many marketing advantages. The e-commerce/customer social media and networking platform enables businesses to sell products and services using various types of deals. The marketing is provided through a wide variety of persons using the social networking functionality of the present invention. This provides more credibility because deals may be marketed based on relational marketing. Additionally, the present invention combines the marketing power of social networking integrated with the e-commerce functionality. In another way, the present invention provides a social networking platform focused on customers and purchases with the e-commerce functionality.

The present invention also provides several marketing keys for businesses. The e-commerce/customer social media and networking platform 14 provides the advantage of ordinary or famous people to endorse their products through a popular social networking medium. Audiences can be easily reached which creates a direct marketing channel between businesses and followers of a person. The businesses also have the option of selling using special offers, pre-releases, original price and exclusive deals. Additionally, businesses may provide a pre-released option which gives the businesses the advantage of testing the market and earn extra profit in the start-up stage of the life cycle of the product. Thus, the e-commerce/customer social media and networking platform may be extremely useful for the promotion of start-up businesses or start-up products. Business users may also initiate a deal through the e-commerce/customer social media and networking platform 14. The business user may select a deal, type of offer and person. This deal may then be presented to a potential buyer and endorser. If accepted by the person (registered on the e-commerce/customer social media and networking platform 14), the promotion may be published on the e-commerce/customer social media and networking platform 14. Advantages are also provided to the persons endorsing a product or service. Endorsing users are compensated for their endorsements.

In further elaboration of the present invention, the present invention is a social media/networking system that allows users to follow other users on the e-commerce/customer social media and networking platform 14. In order to view and know the products/services purchased through the platform 14 for which the user endorses and promotes. This endorsing user may then be provided with some form of compensation for the endorsement. These endorsements may provide encouragement or some form of influence to the user's followers. For the option where the user does not endorse a product, the user may send their negative reviews (i.e., feedback) about their unsatisfied purchased products and services experience secretly and directly to the business who offered the deal. In one embodiment, the user providing feedback may be compensated, given an extra discount or cash back from the business for the deal they purchased, which in turn provides helpful information to the business, thereby improving the business experience and avoiding the impact of negative word of mouth publication.

In one embodiment of the present invention, users will only be encouraged to share publically their positive reviews, favorites and recommended purchased deals to their followers because the present invention provides only the publication of positive reviews of purchased products and services. However, the present invention also provides a private communication conduit from the dissatisfied buyer to the business in which the user provides feedback to the business privately. This differs from current systems which publicly post both positive and negative comments.

In one aspect, the present invention is a private advertising channel that generates personal income to the user (customer). Users of the present invention utilize a private advertising channel where the user may optionally select and buy from a wide variety of products and service which are available through the platform 14. The present invention provides a system which enables the user to easily endorse and promote products and services they have purchased of presented deals.

In existing business e-commerce systems, a business must use at least two or more separate systems in order to sell and promote their products and services. For example, first the business may have an online store plus a separate site involving social media or some secondary advertising mechanism where an endorsing person endorses the product separate from the online store. In these existing systems, oftentimes the endorser receives a flat fee for endorsing a product, or in the case where the fee is based on performance, a referral code scheme is used where a referral code or hyperlink is given to potential customers by the endorsing agent. When the customers use the referral code or hyperlink, compensation is received. Unlike these existing systems, the present invention does not require the use of referral codes or links linking the endorser to the sale of the product. The present invention utilizes a single platform to promote the goods and services while automatically calculating and paying the endorsing users.

The present invention is a system and method utilizing social media to promote positive reviewed purchases to the followers of the user and to others and enable the submission of feedback (i.e., negative reviewed purchases of the user) to the merchant secretly without publication to others (e.g., without sharing the information to the public or other users). The system enables users to view their friends, family member, people in their community, expert, etc. favorite and recommended purchases of the person they follow. This system enables optional compensation on different levels. First, the purchasing user may be compensated for the actual purchase of the product or service. Next, the purchasing user may be optionally rewarded for reviewing the product or service for both endorsements and submission of feedback to the merchant. Third, in the situation where the purchasing user endorses a product or service, the purchasing user may receive compensation when a follower who has seen the recommended or promoted item of the purchasing user purchases the endorsed item. Compensation may be award in a wide variety of ways such as but not limited to cashback, points, discounts on future purchases or any other type of compensation. Additionally, the compensation on each level is optional and may or may not be utilized and still remain in the scope of the present invention.

It should be understood that the present system is not merely an advertising system. Primarily, the present invention is an e-commerce system which provides the option of advertising to users of the system through the use of endorsements and deals through a social media/networking system while simultaneously offering the option for the user to send feedback for items that do not wish to endorse. The present system allows users to promote only what they buy and like rather than just promoting products/services which they have not bought and do not like.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system of promoting a specific product or service by a person, the system comprising:
   a network; and
   an e-commerce/customer social media and networking platform coupled to the network, wherein the e-commerce/customer social media and networking platform includes a social networking module providing social networking services to a plurality of users communicating with the e-commerce/customer social media and networking platform via the network and an e-commerce module for performing online purchase transactions of goods and services published on the e-commerce/customer social media and networking platform, wherein the e-commerce/customer social media and networking platform includes a processor programmed to provide a dual function of social networking services through the social networking module and transacting online purchase of goods and services through the e-commerce module;
   wherein each user of the plurality of users communicates with the e-commerce/customer social media and networking platform through a communications device connected to the network;

wherein the e-commerce module displays products or services for sale to the communication devices of the plurality of users and enacts purchase transactions of a selected product or service selected by a purchasing user, wherein the system receives and stores an endorsement or negative feedback of the selected service or product purchased by the purchasing user, the system includes programming instructions for verifying the purchase of the service or product prior to storing the endorsement or negative feedback, the e-commerce module only storing the endorsement or negative feedback from verified purchases;

wherein the social networking module receives the stored endorsement and publishes the endorsement of the purchasing user to a plurality of followers following the purchasing user through the social networking module;

wherein a purchase and a submission of either an endorsement or negative feedback by the purchasing user purchasing a product or service through the e-commerce/customer social media and networking platform activates the system to automatically award an initial compensation to the purchasing user;

wherein the social networking module determines if a rating by a verified purchasing user is an endorsement or negative feedback;

wherein, upon determining that rating is negative feedback, the social networking module establishes a private communication conduit to the verified purchasing user having the negative feedback and sends private negative feedback via the established private communication conduit to a business associated with the purchased service or product without ever publicizing the negative feedback to any other users, thereby preventing the publication of the negative feedback to other users.

2. The system according to claim 1 wherein the e-commerce module interacts with an e-commerce platform of a third-party business, wherein the e-commerce platform provides e-commerce functionality for transacting purchases of goods or services by the third-party business.

3. The system according to claim 2 wherein the e-commerce platform of the third-party business includes a payment system for transacting purchases of goods and services.

4. The system according to claim 3 wherein the payment system of the e-commerce platform collects information on each individual product and service of the purchasing user and provides the collected information to the e-commerce module.

5. The system according to claim 2 wherein the purchasing user may transact a purchase through the e-commerce platform of the third-party business and a record of the purchase is sent to the e-commerce module of the e-commerce/customer social media and networking platform.

6. The system according to claim 1 wherein the e-commerce module interacts with a point of sale system of a third-party business, wherein the point of sale system enables the purchasing user to purchase a good or service of the third-party business.

7. The system according to claim 6 wherein the point of sale system provides information on each individual product and service of the purchasing user.

8. The system according to claim 1 wherein the purchasing user receives compensation when a follower who view an endorsement of the endorsed product of the purchasing user purchases the endorsed good or service.

9. The system according to claim 8 wherein the purchasing user receives compensation if the follower purchases the endorse good or service within a specified period of time after viewing the endorsement of the purchasing user.

10. The system according to claim 1 wherein the e-commerce module is external to the system and interacts with the e-commerce/customer social media and networking platform.

11. The system according to claim 1 wherein the purchasing user receives compensation when the user provides a review of the purchased product or service.

* * * * *